(12) United States Patent
Chiang et al.

(10) Patent No.: US 9,417,885 B2
(45) Date of Patent: Aug. 16, 2016

(54) COMPUTER SYSTEM AND CONTROL METHOD THEREOF

(71) Applicant: Acer Incorporated, New Taipei (TW)

(72) Inventors: Wei Chiang, New Taipei (TW);
Chia-Hua Yu, New Taipei (TW)

(73) Assignee: ACER INCORPORATED, New Taipei (TW)

( * ) Notice: Subject to any disclaimer, the term of this patent is extended or adjusted under 35 U.S.C. 154(b) by 227 days.

(21) Appl. No.: 14/185,188

(22) Filed: Feb. 20, 2014

(65) Prior Publication Data

US 2014/0310511 A1    Oct. 16, 2014

(30) Foreign Application Priority Data

Apr. 11, 2013    (TW) .............................. 102112808 A

(51) Int. Cl.
*G06F 11/00* (2006.01)
*G06F 9/44* (2006.01)
*G06F 11/14* (2006.01)

(52) U.S. Cl.
CPC .......... *G06F 9/4401* (2013.01); *G06F 11/1417* (2013.01); *G06F 11/1438* (2013.01); *G06F 11/1441* (2013.01)

(58) Field of Classification Search
CPC ............ G06F 11/1417; G06F 11/1438; G06F 11/1441
See application file for complete search history.

(56) References Cited

U.S. PATENT DOCUMENTS

| 2006/0069870 | A1* | 3/2006 | Nicholson | G06F 1/30 711/118 |
| 2009/0003098 | A1* | 1/2009 | Hoess | G11C 29/832 365/200 |
| 2009/0049270 | A1* | 2/2009 | Khatri | G06F 11/1666 711/203 |
| 2009/0217102 | A1* | 8/2009 | Co | G11C 29/56016 714/42 |
| 2009/0240934 | A1 | 9/2009 | Chou | |
| 2011/0093741 | A1 | 4/2011 | Liang et al. | |
| 2013/0227342 | A1* | 8/2013 | Shepherd | G11C 29/44 714/6.13 |

FOREIGN PATENT DOCUMENTS

| CN | 1629806 | 6/2005 |
| CN | 101339513 | 1/2009 |
| CN | 101566951 | 1/2009 |
| TW | 200941344 | 10/2009 |
| TW | 201113704 | 4/2011 |

OTHER PUBLICATIONS

Chinese language office action dated May 22, 2015, issued in application No. TW 102112808.

* cited by examiner

*Primary Examiner* — Charles Ehne
(74) *Attorney, Agent, or Firm* — McClure, Qualey & Rodack, LLP

(57) ABSTRACT

A computer system and a control method thereof are described. The computer system includes a first memory, a second memory, and a control module. The first memory is configured to store a Basic Input Output System (BIOS) program. The second memory includes a first memory block and a second memory block. The control module, when a scan function is initiated, is configured to execute the BIOS program to generate a first restart program, wherein the control module is configured to store the first restart program into the first memory block and scan the second memory block, and stop using an abnormal cell in the second memory block.

20 Claims, 3 Drawing Sheets

COMPUTER SYSTEM AND CONTROL METHOD THEREOF

CROSS REFERENCE TO RELATED APPLICATIONS

This Application claims priority of Taiwan Patent Applications No. 102112808, filed on Apr. 11, 2013, the entirety of which is incorporated by reference herein.

BACKGROUND OF THE INVENTION

1. Field of the Invention

The present invention relates to computer system, and in particular, to a computer system which does not use abnormal memory cells.

2. Description of the Related Art

The primary function of a memory is to record data. The memory may be roughly classified into non-volatile memories and volatile memories. Volatile memories require power to maintain data storage, whereas non-volatile memories can maintain data storage without power. Take volatile memories as an example, generally speaking, a memory contains a number of memory cells therein to store data. However, when data is stored into abnormal memory cells, the computer system may malfunction due to inaccurate data provided by the abnormal memory cells. If occurring, if the user does not replace the memory immediately, the computer system will not be able to operate in a normal state.

BRIEF SUMMARY OF THE INVENTION

A detailed description is given in the following embodiments with reference to the accompanying drawings.

An embodiment of a computer system is described, comprising a first memory, a second memory, and a control module. The first memory is configured to store a Basic Input Output System (BIOS) program. The second memory comprises a first memory block and a second memory block. The control module, when a scan function is initiated, is configured to execute the BIOS program to generate a first restart program, wherein the control module is configured to store the first restart program into the first memory block and scan the second memory block, and stop using an abnormal cell in the second memory block.

Another embodiment of a control method is disclosed, adopted by a volatile memory comprising a first memory block and a second memory block, the method comprising: determining whether a scan function has been initiated; and when the scan function has been initiated, executing a BIOS program to generate a first restart program, storing the first restart program into the first memory block, scanning the second memory block to detect an abnormal memory cell, and stopping the using of the abnormal memory cell.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
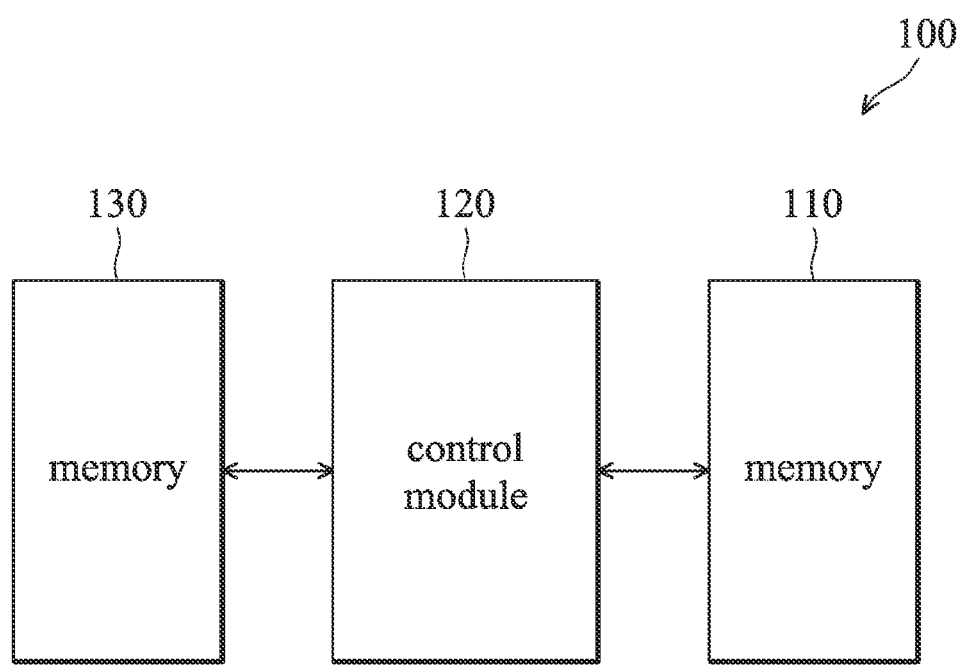
FIG. 1 is a block diagram of a computer system according to an embodiment of the invention.

FIG. 1 is a block diagram of a computer system according to an embodiment of the invention. As shown in FIG. 1, the computer system 100 includes a memory 110, 130, and a control module 120. The type of the computer system 100 is not limited in the invention. In an embodiment, the computer system 100 is a notebook computer (NB), a desktop personal computer (PC) or other electronic devices.

The memory 110 stores a Basic Input Output System (BIOS) program therein. In one embodiment, the memory 110 is a non-volatile memory. In another embodiment, the memory 110 is a Read-Only Memory (ROM) with a Serial Peripheral Interface (SPI). In yet another embodiment, the memory 110 is an Electrically-Erasable Programmable Read-Only Memory (EEPROM).

The control module 120 accesses the memories 110 and 130 to execute a corresponding program. In the embodiment, the control module 120 executes the BIOS program stored in the memory 110 to generate a complete startup program, and stores the complete startup program to the memory 130. In another embodiment, the control module 120 executes the complete startup program stored in the memory 130 to load an operating system program into the memory 130.

Figures 2A, 2B:
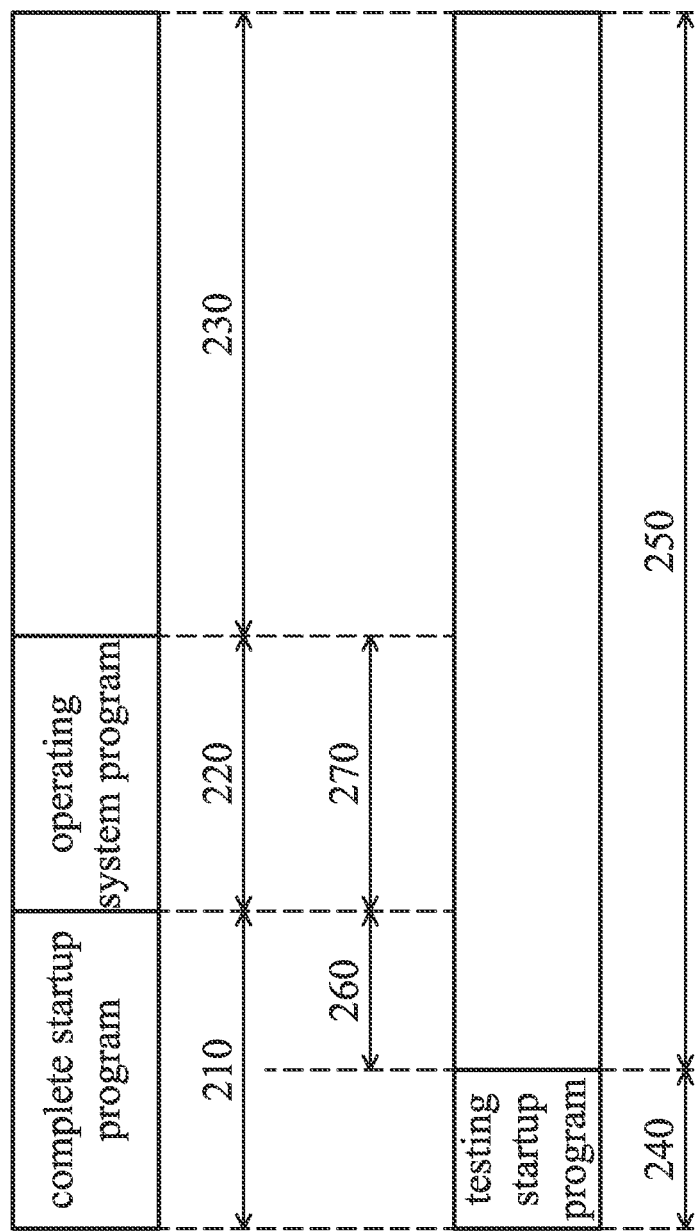
FIG. 2A illustrates the internal data of the memory 130 according to an embodiment of the invention.
FIG. 2B illustrates internal blocks of the memory 130 after the scan function is initiated.

FIG. 2A illustrates the internal data of the memory 130 according to an embodiment of the invention. In the invention, the memory is a volatile memory. As shown in the FIG. 2A, the memory 130 can be divided into memory blocks 210 to 230. The memory block 210 stores the complete startup program. The memory block 220 stores the operating system program. In the example, the memory block 230 has not yet stored any data.

When the computer system 100 is in an abnormal condition such as the Blue Screen of Death (BSOD), it will indicate that a part of the memory cell in the memory 130 is operating abnormally. As a consequence, a user may restart the computer system 100 and enter the BIOS configuration screen, to initiate a scan function which is configured to scan the state of the memory 130. In another embodiment, when a computer crash has not occurred in the computer system 100, the user may initiate a scan function in the operating system (e.g. windows). In other embodiments, the user restarts the computer system, and initiates the scan function for the memory in the operating system, or the computer system 100 can re-initiate the scan function during a fixed period of time (such as monthly or quarterly).

Regardless of being in the BIOS setup screen or the operating system, so long as the scan function is enabled, the control module 120 will perform a restart operation such as restarting the computer system 100. After the restart operation, the control module 120 performs the part of the BIOS program stored in the memory 110 for generating a testing startup program, and stores the testing startup program therein to the memory 130.

The scope of the invention is not limited to the relationship between the testing startup program and the complete startup program. In the embodiment, the testing startup program has a smaller size than that of the complete memory program. In another embodiment, the control module 120 executes all BUIS programs, thus, the testing startup program equals to the complete startup program.

FIG. 2B illustrates internal blocks of the memory 130 after the scan function is initiated. As shown by FIG. 2B, the memory 130 is divided into memory blocks 240 and 250. The memory block 240 stores the testing startup program therein, and the memory block 250 has not yet stored any data therein. In the embodiment, since the testing startup program has a size smaller than that of the complete startup program, consequently, the memory block 240 is less than the memory block 210. In another embodiment, when the testing startup program equals to the complete startup program, the memory block for storing the testing startup program has a size that is equal to that of the memory block which stores the complete startup program.

After the control module 120 stores the testing startup program into the memory block 240, the control module 120 can scan the memory block 250 and stopping the using of the abnormal memory cell in the memory block 250. Therefore, a user may still use the other normal memory cells in the memory 130, rather than having to replace it with a new memory for a few abnormal memory cells.

The scope of the invention is not limited to how the control module 120 finds the abnormal memory cell in the memory 130. In one embodiment, the control module 120 is configured to store predefined data into the memory block 250, and then read from the memory block 250. When the read data is different from the predefined data, then the corresponding memory cell is deemed abnormal. Subsequently, the control module 120 records the address of the abnormal memory cell, and stops using the abnormal memory cell.

In one embodiment, the control module 120 generates an abnormal log based on the address of the abnormal memory cell, and then keeps the abnormal log in the local memory or in the memory 110 or 130. After the control module 120, memory 110 or 130 stores the abnormal log, the control module 120 can perform the restart operation again. After the restart operation, the control module 120 can execute the BIOS program stored in the memory 110 to generate the complete startup program and store the complete startup program into the memory block 210 of the memory 130. As shown in FIGS. 2A and 2B, the complete startup program has a data size larger than that of the testing startup program, therefore the first program code of the complete startup program is stored in the memory block 240, and the second program code of the complete startup program is stored in the memory block 250.

The control module 120 can prevent use of the abnormal memory cells in the memory block 250 based on the abnormal log. For example, when an abnormal memory cell appears in the memory block 260, the control module 120 will not store the program codes of the complete startup program into the abnormal memory cell of the memory block 260. Further, when the abnormal memory cell appears in the memory block 270 or 230, the control module 120 will not store any data into the abnormal memory cell of the memory block 270 or 230.

In one embodiment, when the addresses of the abnormal memory cells are continued, the control module 120 will not use the memory cells corresponding to the continued addresses. For example, when the memory cells addressed by 0001 through 0005 are abnormal, then the control module 120 will not use the memory cells addressed by 0001 through 0005. In another embodiment, when the addresses of the abnormal memory cells are discontinuous, the control module 120 will record a start address and an end address for the abnormal memory cells, and be prevented from using the memory cells between the start address and the end address. For example, when the memory cell addressed by 0001, 0005 and 0009 are abnormal, then the control module 120 will not use the memory cells from 0001 to 0009.

The internal structure of the control module 120 is not limited by the invention. Any circuitry which may access the circuit of the memory can be employed as the control module 120. In the embodiment, the control module 120 contains at least one central processing unit (CPU), at least one memory controller, a north bridge chip or other types of microprocessor or controller.

Figure 3:
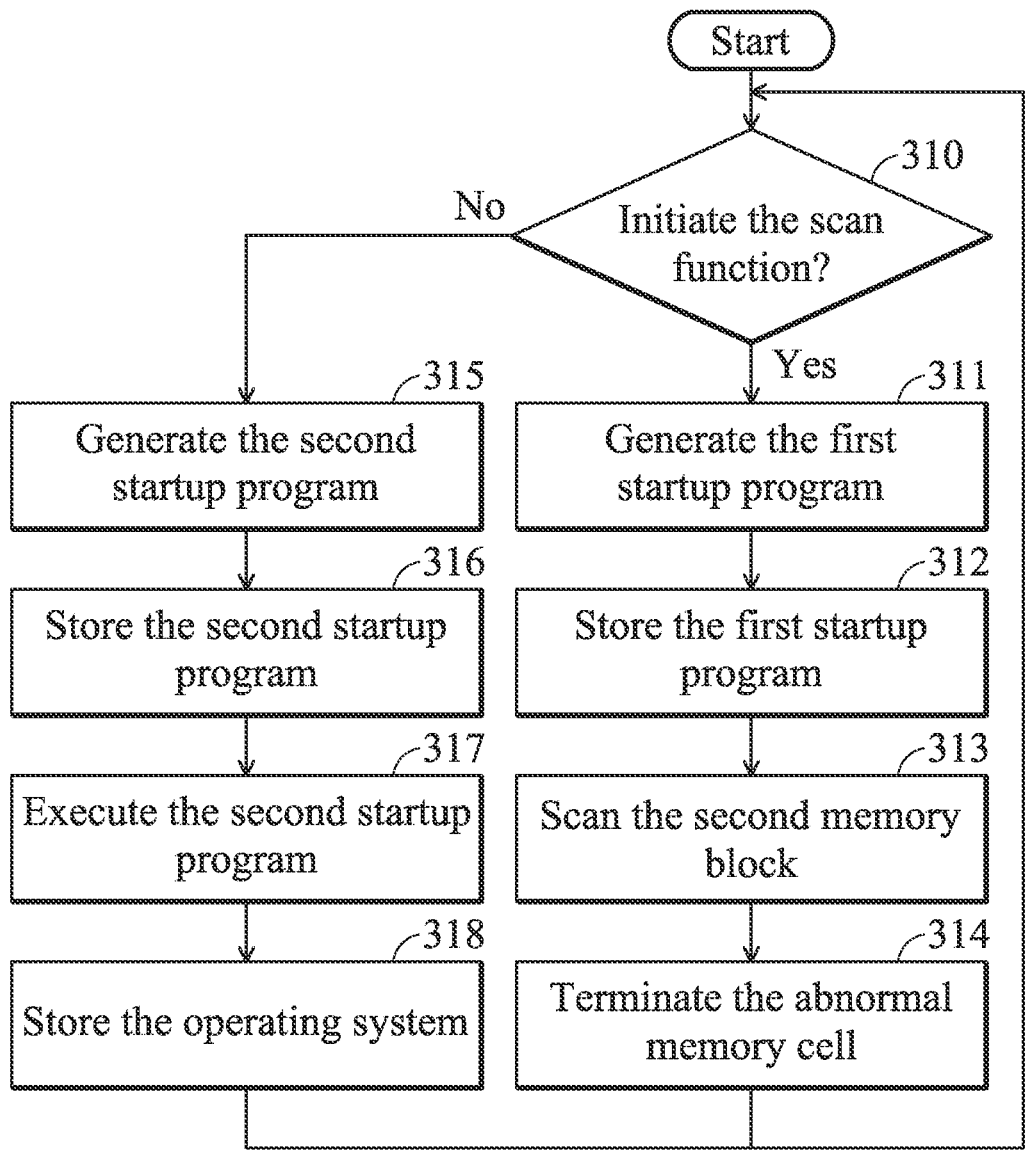
FIG. 3 is a flowchart of a control method according to an embodiment of the invention.

FIG. 3 is a flowchart of a control method according to an embodiment of the invention. The control method disclosed by the embodiment can be adopted by a volatile memory in a computer system, wherein the volatile memory includes a first memory block and a second memory block. Firstly, whether a scan function may be initiated is determined (Step 310). When the computer system has an abnormal condition such as BSOD, it indicates that the volatile memory is abnormal. Thus, a scan function is initiated to find the abnormal memory cell in the volatile memory. In one embodiment, the computer system is restarted and a BIOS configuration screen is entered, to initiate the scan function which scans the volatile memory. In another embodiment, the scan function is imitated in the operating system.

When the scan function has been initiated, a BIOS program is executed to produce a first restart program (Step 311). In the embodiment, the BIOS program is stored in a non-volatile memory such as SPI ROM or EEPROM. In another embodiment, when the scan function has been initiated, a restart operation is executed to restart the computer system, and then the BIOS program is executed (Step 311).

Next, the first restart program is stored into the first memory block of the volatile memory (Step 312), then the second memory block of the volatile memory is scanned to prevent use of the abnormal memory cells in the second memory block (Step 313). The approaches for scanning the second memory block are not limited by the invention. In one embodiment, the second memory block is scanned in a continuous or discontinuous manner. For example, the predefined data is written into the second memory block in the continuous or discontinuous manner, then the data stored in the second memory block are read in the continuous or discontinuous manner. By comparing the predefined data and the read data, it can be determined whether an abnormal memory cell is present in the second memory block.

In another embodiment, when an abnormal memory cell is detected, the address of the abnormal memory cell can be recorded to generate an abnormal log. Then the abnormal memory cells are prohibited from being used (Step 314). In one embodiment, the abnormal log and the BIOS program are stored in the non-volatile memory. In another embodiment, the abnormal log is stored in the volatile memory.

Next, returning to Step 310, the initiation of the scan function is again determined. In one embodiment, a restart operation (not shown) is performed after the Step 314 is executed, to restart the computer system. Then it is determined again whether the scan function has been initiated (Step 310).

When the scan function is deactivated, the BIOS program is executed to generate a second restart program. In one embodiment, the second program has a data size equal to that of the first restart program in Step 311. In another embodiment, the complete BIOS program is executed in Step 315, and a part of the BIOS program is executed in Step 311. Therefore, the second restart program has a data size that is larger than that of the first restart program in Step 311.

The second restart program is stored (Step 316). In one embodiment, the second restart program will be used to replace the first restart program in the first memory block. When the second restart program has a data size exceeding that of the first restart program in Step 311, then a part of the second restart program (such as the first program code) will be stored into the first memory block, while another part of the second restart program will be stored into the second memory block.

The second restart program is stored (Step 316). In one embodiment, the second restart program will be used to replace the first restart program in the first memory block. When the second restart program has a data size exceeding that of the first restart program in Step 311, then a part of the second restart program (such as the first program code) will be stored into the first memory block, while another part of the second restart program will be stored into the second memory block.

The second restart program is executed to generate an operating system code (Step 317) and store the operating system code into the second memory block (Step 318). In one embodiment, the abnormal memory cell in the second memory block is not to be used based on the stored abnormal log. Thus, the operating program code will not be stored in the abnormal memory cell in the second memory block.

Since the data will not be stored into the abnormal memory cell, the operation of the memory can be ensured, and a user need not replace a new memory immediately. Moreover, when the number of the abnormal memory cells is small, the user can carry on using the old memory without the need of purchasing new memory, resulting in a reduction in cost. In addition, when the scan function has been initiated, if only a necessary part of the restart program is stored in the volatile memory, an increased memory block may be scanned.

Unless otherwise defined, all terminologies (including technical and scientific terminologies) confirm to the common understanding of those people in the art. Further, unless a clear indication is provided, terminologies defined by an ordinary dictionary confirm to those in the articles of related technology field.

While the invention has been described in connection with various aspects, it will be understood that the invention is capable of further modifications. This application is intended to cover any variations, uses or adaptation of the invention following, in general, the principles of the invention, and including such departures from the present disclosure as falling within the known and customary practice within the art to which the invention pertains.

What is claimed is:

1. A computer system, comprising:
   a first memory, storing a Basic Input Output System (BIOS) program;
   a second memory, comprising a first memory block and a second memory block; and
   a control module, when a scan function is initiated, configured to execute the BIOS program to generate a first restart program, wherein the control module is configured to store the first restart program into the first memory block and scan the second memory block, and stop using an abnormal cell in the second memory block, and
   wherein when the scan function has not been initiated and the control module is configured to execute the BIOS program, the control module is configured to generate a second restart program having a data size that is equal to that of the first restart program.

2. The computer system of claim 1, wherein the control module is configured to generate an abnormal log based on the address of an abnormal memory cell.

3. The computer system of claim 2, wherein the abnormal log is stored in one of the control module, the first and the second memories.

4. The computer system of claim 3, wherein when the scan function is being initiated, the control module is configured to execute a restart operation, and execute the BIOS program to generate the first restart program after the restart operation.

5. The computer system of claim 4, wherein after the abnormal log is stored in one of the control module, the first and the second memories, the control module is configured to execute the restart operation again, execute the BIOS program to generate the second restart program after the restart operation, and be prevented from using the abnormal memory cell in the second memory block based on the abnormal log.

6. The computer system of claim 1, wherein the first memory is a non-volatile memory, and the second memory is a volatile memory.

7. A computer system, comprising:
   a first memory, storing a Basic Input Output System (BIOS) program;
   a second memory, comprising a first memory block and a second memory block; and
   a control module, when a scan function is initiated, configured to execute the BIOS program to generate a first restart program, wherein the control module is configured to store the first restart program into the first memory block and scan the second memory block, and stop using an abnormal cell in the second memory block,
   wherein when the scan function has not been initiated and the control module is configured to execute the BIOS program, the control module is configured to generate a second restart program having a data size that exceeds that of the first restart program.

8. The computer system of claim 7, wherein the second restart program contains a first program code and a second program code, and the first program code is stored into the first memory block to replace the first restart program, and the second program code is stored into the second memory block.

9. The computer system of claim 8, wherein when the control module is configured to execute the second restart program, an operating program code is generated, and the operating program code is stored in the second memory block.

10. The computer system of claim 7, wherein the control module is configured to generate an abnormal log based on the address of an abnormal memory cell.

11. The computer system of claim 10, wherein the abnormal log is stored in one of the control module, the first and the second memories.

12. The computer system of claim 11, wherein when the scan function is being initiated, the control module is configured to execute a restart operation, and execute the BIOS program to generate the first restart program after the restart operation.

13. The computer system of claim 12, wherein after the abnormal log is stored in one of the control module, the first and the second memories, the control module is configured to execute the restart operation again, execute the BIOS program to generate the second restart program after the restart operation, and be prevented from using the abnormal memory cell in the second memory block based on the abnormal log.

14. The computer system of claim 7, wherein the first memory is a non-volatile memory, and the second memory is a volatile memory.

15. A control method, adopted by a volatile memory comprising a first memory block and a second memory block, the method comprising:
   determining whether a scan function has been initiated;
   when the scan function has been initiated, executing a BIOS program to generate a first restart program, storing the first restart program into the first memory block, scanning the second memory block to detect an abnormal memory cell, and stopping the using of the abnormal memory cell, and when the scan function has not been initiated, executing the BIOS program to generate a second restart program, wherein a data size of the second restart program is equal to or exceeds that of the first restart program.

16. The control method of claim 15, further comprising:

storing a first program code of the second restart program into the first memory block; and storing a second program code of the second restart program into the second memory block.

17. The control method of claim 16, further comprising:

executing the second restart program to generate an operating program code; and storing the operating program code into the second memory block.

18. The control method of claim 15, further comprising:

generating an abnormal log based on the address of an abnormal memory cell; and storing the abnormal log.

19. The control method of claim 18, further comprising:

when the scan function is being initiated, executing a restart operation and executing the BIOS program to generate the first restart program after the restart operation.

20. The control method of claim 19, further comprising:

after storing the abnormal log, executing the restart operation again;

executing the BIOS program to generate the second restart program after the restart operation again;

stopping the using of the abnormal memory cell in the second memory block based on the abnormal log.

\* \* \* \* \*